United States Patent [19]

Nichols et al.

[11] Patent Number: 4,617,859
[45] Date of Patent: Oct. 21, 1986

[54] MEAT PRODUCT PRESS APPARATUS

[76] Inventors: Albert D. Nichols, 1505 East Graber; Raymond C. Nichols, 1201 Luther, both of Wichita, Kans. 67216

[21] Appl. No.: 752,533

[22] Filed: Jul. 8, 1985

[51] Int. Cl.[4] ............................................. A47J 43/18
[52] U.S. Cl. ..................................... 99/351; 100/265; 100/910
[58] Field of Search ................... 99/351; 100/910, 265, 100/194; 17/1 R, 32, 44.2

[56] References Cited

U.S. PATENT DOCUMENTS

| | | | |
|---|---|---|---|
| 1,101,193 | 6/1914 | Adenayer | 100/910 X |
| 2,059,938 | 11/1936 | Farber | 100/265 |
| 2,310,957 | 2/1943 | Hoy | 99/351 |
| 2,431,253 | 11/1947 | Hoy | 99/351 |
| 3,155,030 | 11/1964 | Curtis | 100/194 |
| 3,202,086 | 8/1965 | Brubaker | 99/351 |
| 3,548,741 | 12/1970 | Wiley | 100/265 X |
| 4,386,451 | 6/1983 | Phillips | 100/910 X |

Primary Examiner—Billy J. Wilhite
Attorney, Agent, or Firm—Phillip A. Rein

[57] ABSTRACT

This invention relates to a meat product press apparatus adapted to hold and compress ham members or the like during a meat packing plant processing procedures. The meat product press apparatus includes a lower press assembly interconnected by a main clamp assembly to a top press assembly. The lower and top press assemblies provide grate or grid type structures presented in spaced, parallel planes to clamp the meat product therebetween. The main clamp assembly includes an initial bias lock assembly to interconnect adjacent ends of the lower and top press assemblies and a pressure bias lock assembly to interconnect the spaced, opposite adjacent ends of the lower and top press assemblies. The initial bias lock assembly includes a pair of spaced spring members which are connectable to a cam lock member. The pressure bias lock assembly includes spring members each having one end connected to the lower press assembly and a top end connected to an upper cam lock member and having a handle cam lock member secured to the spring members engagable with the upper cam lock member. The handle cam lock member is operable to engage the upper cam lock member and operable to move the upper cam lock member into a locked position to hold the cam lock member and the handle cam lock member in the clamped condition.

12 Claims, 9 Drawing Figures

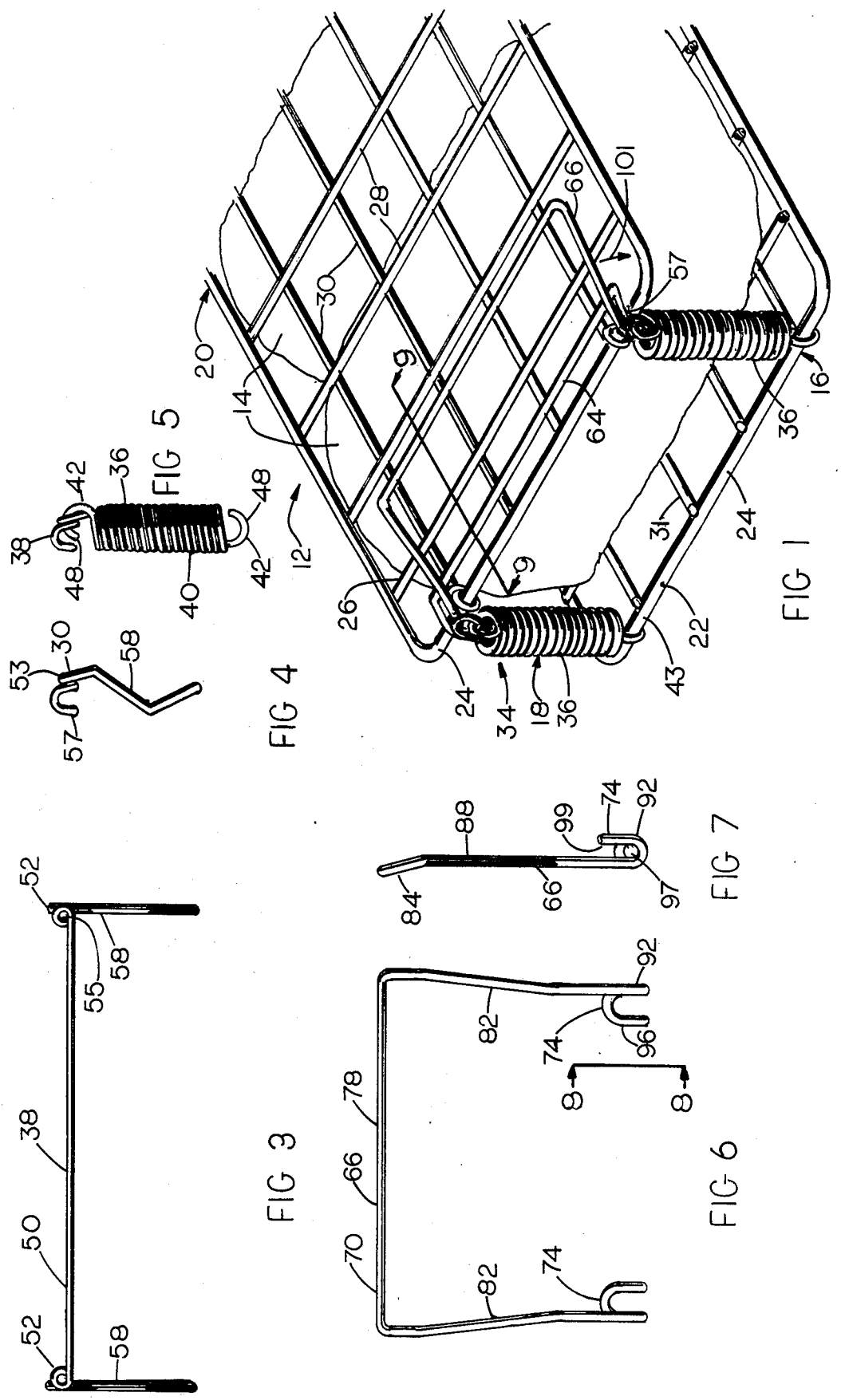

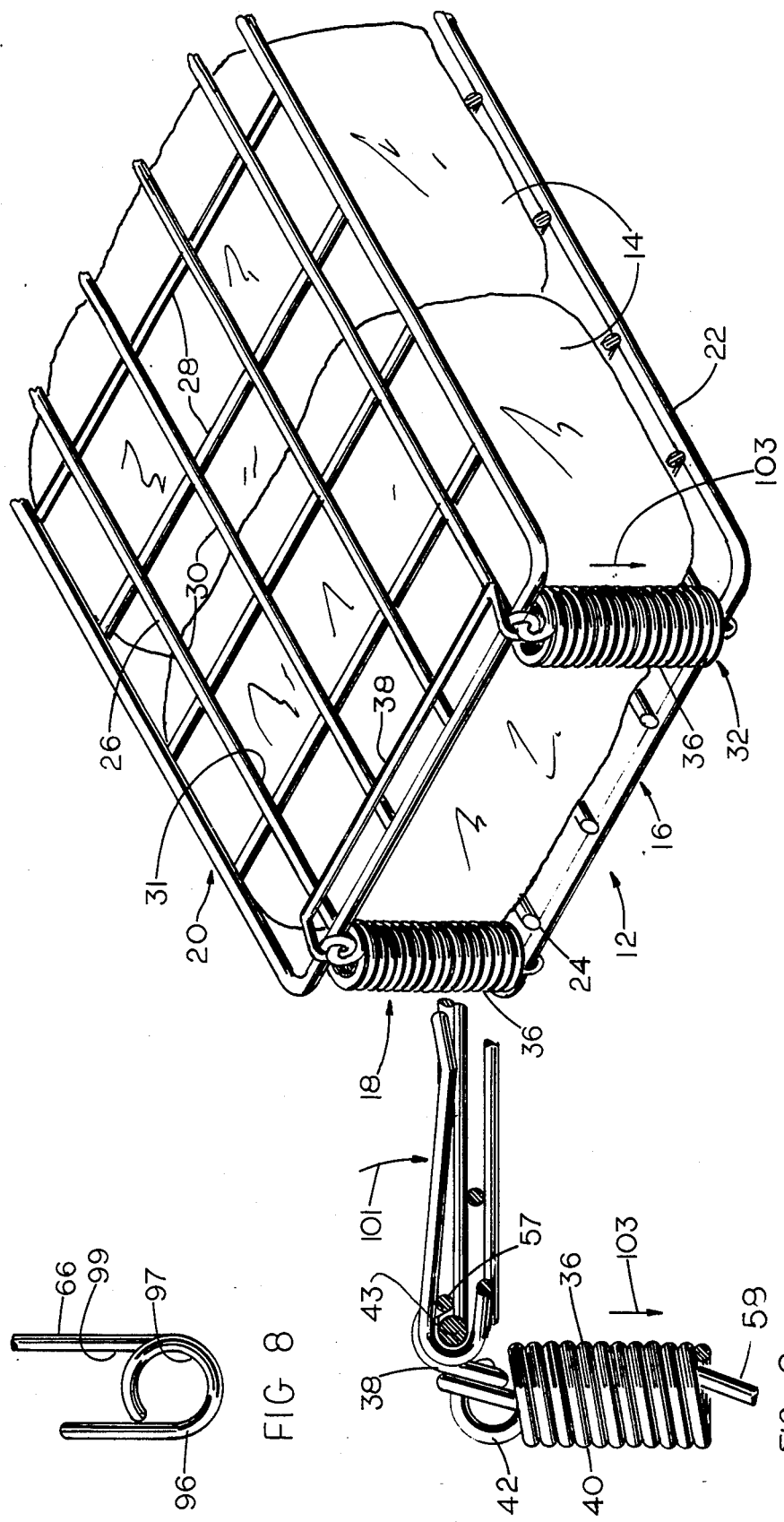

MEAT PRODUCT PRESS APPARATUS

PRIOR ART

A patentability investigation was conducted on this invention and the following U.S. Patents were noted:

| Reg. No. | Invention |
| --- | --- |
| 2,130,957 | APPARATUS FOR THE MULTIPLE MOLDING OF HAMS AND THE LIKE |
| 3,155,030 | MULTIPLE HAM PRESS |
| 3,202,086 | HAM RACK ASSEMBLY |
| 4,386,451 | METHOD AND MEANS OF COMPRESSING MEAT PRODUCTS |

The Brubaker patent discloses a single ham rack assembly having upper and lower mold compression plates placed about a meat product such as a ham to be processed in a meat packing plant. Spring members are individually interconnected to the aforementioned mold plates to provide compression to the meat product.

The Curtis patent discloses a multiple ham press structure whereupon spring members are used to provide the compression or biasing feature. This structure is unsatisfactory as you need to lift the opposite ends of the compression elements in order to slide the meat products therebetween.

The Phillips et al patent discloses a plurality of stacked compression elements as best shown in FIGS. 1 and 5 and utilizes a special handle structure. The Phillips et al device is not satisfactory in usage as it is provided with abutment elements so that all the ham product structures are compressed the same thickness which, in many cases, is not desired in order to achieve the best resultant end product.

The Hoy patent discloses an apparatus for holding and compressing meat products utilizing a plurality of springs and guide posts. In this device, the upper plate is mounted about guide rods to assure proper axial alignment and tension springs are attached individually to achieve the biasing force. This would appear to be a time comsuming process not found in the applicant's invention.

It is noted that the applicant's invention as set forth herein provides a simplified structure to provide for the ready and easy clamping and release of meat products therein as will be described in detail.

PREFERRED EMBODIMENT OF THE INVENTION

In one preferred embodiment of this invention, a meat product press apparatus is provided to hold a meat product such as a ham member in a clamped, compressed condition while the same is being cooked and/or smoked in the processing procedure normally found in meat packing plants. The meat product press apparatus includes a lower press assembly and a top press assembly interconnected by a main clamp assembly. The lower press assembly and the upper or top press assembly are substantially identical and each includes a main support grate assembly having a rectangular support frame interconnected by parallel first and second support rods. Each support grate or press assembly lies in substantially a common respective horizontal plane so as to present a gridlike support or compression plate type structure. The main clamp assembly includes an initial bias lock assembly operable to interconnect one end spaced but adjacent support grate assemblies of the lower and top press assemblies; and a pressure bias lock assembly adapted to interconnect the opposite spaced, adjacent ends of the support grate assemblies of the lower and top press assemblies. The initial bias lock assembly includes spring members interconnected at one end to the lower press assembly and connected by a cam lock member to the top press assembly. The tension spring members are locked and unlocked in a clamped condition by the cam lock member. The pressure bias lock assembly includes spring members interconnected at one end to the lower press assembly and having a upper cam lock assembly to connect same to the top press assembly and, additionally, having a handle cam lock member which is adapted to provide a final cam type locking feature to provide compression pressure on the meat products held between lower and top press assemblies. The handle cam lock member is operable through its interconnection so as to provide a unique leverage feature to achieve the clamping action of this invention.

OBJECTS OF THE INVENTION

One object of this invention is to provide a meat product press apparatus which is operable to hold and compress a meat product such as a plurality of ham members between upper and lower support members in a compressed manner.

One other object of this invention is to provide a meat product press apparatus having upper and lower support members to receive a meat product therebetween and having a main clamp assembly which is readily and easily operable in a simple and efficient manner to provide movement of the upper support member toward the lower support member to achieve a clamping process.

Still, one further object of this invention is to provide a meat product press apparatus for the multiple pressing, holding, and molding of meat products for a cooking and/or smoking process which is readily cleaned and kept in a sanitary condition to meet state and federal government regulations.

One other object of this invention is to provide a meat product press apparatus having grid type lower and top press assemblies interconnected by main clamp assembly through a cam action so as to readily allow the processing heat and smoke to act on substantially all surfaces of the meat product to achieve a superior cooked and/or smoked meat product.

Still, one other object of this invention is to provide a meat product press apparatus which can be constructed of stainless steel for sanitary reasons; is sturdy in construction; economical to manufacture; substantially maintenance free; and easy to use.

Various other objects, advantages, and features of this invention will become apparent to those skilled in the art from the following discussion, taken in conjunction with the accompanying drawings, in which:

FIG. 1 is a perspective view of one end section of of the meat product press apparatus of this invention;

FIG. 2 is a perspective view of the other end section of the meat product press apparatus of this invention having common lower and top press assembilies interconnected;

FIG. 3 is a elevational view of a cam lock member of an initial bias lock assembly of the meat product press apparatus of this invention;

FIG. 4 is a side elevational view of the cam lock member as shown in FIG. 3;

FIG. 5 is an elevational view of a spring member of a main clamp assembly of the meat product press apparatus of this invention;

FIG. 6 is an elevational view of an upper cam lock member of a pressure bias lock assembly of the meat product press apparatus of this invention;

FIG. 7 is a side elevational view of the upper cam lock member illustrated in FIG. 4;

FIG. 8 is an enlarged fragmentary sectional view taken along line 8—8 in FIG. 6; and FIG. 9 is an enlarged fragmentary sectional view taken along line 9—9 in FIG. 1.

The following is a discussion and description of preferred specific embodiments of the new meat product press apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings and more particularly to FIGS. 1 and 2, a meat product press apparatus of this invention, indicated generally at 12, is shown in the usage or clamped condition having a plurality, namely, two (2) meat products or ham members 14 being held and clamped thereby. It is obvious that the two (2) ham members 14 are shown in FIG. 2 but the meat product press apparatus 12 of this invention could be extended in length and width and perhaps hold more than two (2) ham members 14 but is found that this size is easy to be used and operated by one (1) person and preferred.

The meat product press apparatus 12 includes a lower press assembly 16 interconnected by a main clamp assembly 18 to an upper or top prress assembly 20. The entire meat product press apparatus 12 is shown by the combination of FIGS. 1 and 2. The lower press assembly 16 includes a main support grate assembly 22 extended in a substantially common plane.

The support grate assembly 22 includes a generally rectangular support frame 24 having a plurality of grid support members 26 interconnected between the support frame 24. More particularly, the grid support members 26 include first and second support rods 28 and 30. The first support rods 28 are extended generally parallel to each other and perpendicular to the second support rods 30 to present a grid type structure having square areas 31 present between adjacent ones of the first and second support rods 28, 30.

The top press assembly 20 is substantially identical to the lower press assembly 16 as previously described having the support grate assembly 22. The support grate assembly 22 includes the previously described rectangular support frame 24 interconnected as by grid support members 26. The grid support members 26 include the first and second support rods 28, 30 to achieve the grid-like support structure.

The main clamp assembly 18 includes an (1) initial bias lock assembly 32 to interconnect adjacent ends of the lower and top press assemblies 16, 20 and (2) a pressure bias lock assembly 34 to interconnect the opposite adjacent ends of the lower and top press assemblies 16, 20.

The initial bias lock assembly 32 includes a pair of spaced spring or bias members 36 connected at a lower end to the lower press assembly 16 and interconnected at an upper end to the top press assembly 20 by a cam lock member 38.

Each spring member 36 includes a main compression body 40 having a press connector section 42 integral at each opposite end thereof.

A lower one of the press connector sections 42 includes a C-shaped portion 48 which is adapted to placed about and connected to an end section 43 of the support frame 24 of the lower press assembly 16.

The upper one of the press connector sections 42 are each provided with a C-shaped portion 48 which is adapted to be connected to the cam lock member 38.

As noted in FIGS. 3 and 4, the cam lock member 38 includes a main actuator body 50 having parallel spaced connector assemblies 52 at each opposite end thereof, integral with laterally extending end sections 58. The end sections 58 are parallel to each other and extended perpendicular to the actuator body 50 so as to be of generally U-shaped in one place. Each end section 58 is of generally Z-shape in another plane for reasons to be explained.

Each connector assembly 52 forms a loop section 53 to define a central hole 55 (FIG. 3) to receive a respective one of the upper connector sections 42 of the spring members 36 therethrough as shown in FIG. 5. Also, each connector assembly 52 includes an anchor section 57 to engage the end section 43 of the support frame 24 of the top press assembly 20 in the clamped condition.

As shown in FIGS. 1 and 9, the pressure bias lock assembly 34 includes (1) the spring members 36 interconnected at one end thereof to the lower press assembly 16; (2) an upper cam lock member 64 operable to interconnect the top portion of the spring members 36 to the top press assembly 20; and (3) a handle cam lock member 66 engagable with the spring members 36 and the upper cam lock member 64 to achieve the cam locking and compression action against the food product or ham members 14 as will be explained.

The spring members 36 for the pressure bias lock assembly 34 have been previously described for the initial bias lock assembly 32.

The upper cam lock member 64 is identical to the cam lock member 38 as described for the initial bias lock assembly 32 having the same elements therein as shown in FIGS. 3 and 4.

The handle cam lock assembly 66 as shown in FIGS. 6 and 7 includes a main handle body member 70 with end connector assemblies 74 provided at spaced opposite ends thereof. The main handle body member 70 includes a central body 78 having integral end leg sections 82 at opposite ends thereof. Each end leg section 82 includes an inclined handle portion 84 integral with connector portions 88.

Each end connector assembly 74 includes an integral U-shaped connector loops 92 integral with a U-shaped connector section 96. As noted in FIGS. 6 and 7, the U-shaped connector loop 92 and connector sections 96 are perpendicular to each other and define an anchor hole 97 and a U-shaped cam lock connector groove 99. The anchor holes 97 are operable to receive an end section 43 of the support frame 24 of the top press assembly 20 there as will be described.

The connector grooves 99 are operable to receive a portion of the actuator body 50 therein in the clamped usage condition.

USE AND OPERATION OF THE INVENTION

In the use and operation of the meat product press apparatus 12 of this invention, it is seen that the entire structure is noted by the combination of FIGS. 1 and 2 as each Figure shows an opposite end portion thereof. It is obvious that the lower and top press assemblies 16, 20 as shown in FIGS. 1 and 2 are joined together and present integral grate structure in adjacent parallel planes.

As seen in FIGS. 2 and 5, the end sections 58 of the cam lock member 38 are placed within the respective spring members 36. The upper connector sections 42 of the spring members 36 are placed within the respective holes 55. The anchor section 57 of the cam lock member 38 is placed over the end section 43 of the support frame 24 of the top press assembly 20. The spring members 36 provide a biasing force between the lower and top press assemblies 16, 20.

As noted in FIGS. 1 and 2, the meat or ham product members 14 are shown in the usage condition for smoking and/or cooking being clamped between the lower and top press assemblies 16, 20 by the main clamp assembly 16.

As noted in FIG. 1, the upper cam lock member 64 and the handle cam lock member 16 are shown in the clamped condition with the spring members 36 providing the locking or biasing force downwardly against the end section 43 of the support frame 24 of the top press assembly 20. At this time, the main actuator body 50 of the cam lock member 64 is within the connector grooves 99 of the handle cam lock assembly 66 to bias same as indicated by the arrow 101.

On use and operation of the meat product press assembly 12 from an unclamped condition, it is obvious that the meat products or ham members 14, being two (2) thereof as shown in FIGS. 1 and 2, are placed between the lower and top press assemblies 16, 20. First, the cam lock member 38 is moved to the usage clamped position as shown in FIG. 2 which applies initial clamping action at one end. In certain applications, the cam lock member 38 may be eliminated and the upper connector sections 42 of the spring members 36 of the initial bias lock assembly 32 can be connected directly to the adjacent end section 43 of the top press assembly 20.

At the opposite end the body member 70 of the handle cam lock member 66 is placed under the actuator body 50 and between the end sections 58 of the upper cam lock member 64. The handle cam lock member 66 is then rotated in the direction of the arrow 101. On initial movement, the actuator body 50 slides down the end leg sections 82 into the connector grooves 99 of the handle cam lock member 66. At this point, the spring members 36 at the pressujre bias lock assembly 34 are assisting further rotational movement of the handle cam lock member 66.

Next the handle cam lock member 66 is further rotated in the direction of the arrow 101 to the position of FIGS. 1 and 8. At this point, the spring members 36 pull downwardly as indicated by a an arrow 103 to hold the top press assembly 20 and the handle cam lock member 66 is the clamped condition.

It is seen that a cam action is involved on moving the respective ones of the cam lock members 38 and 64 to their locked positions relative to the top press assembly 20 through use of the handle cam lock member 66.

After smoking and/or cooking the ham members 14, the handle cam lock member 66 is movable in a direction opposite to the arrow 101 to the released condition so that the processed ham members 14 can be removed therefrom and new meat products put therein for processing.

It is seen that the meat product press apparatus of this invention provides a simplified structure adapted to hold meat products therein in a clamped, spaced relationship for smoking and/or cooking or other food processing steps. The meat product press apparatus can be totally constructed of stainless steel so as to be easily cleaned and sanitized to meet health code requirements.

The meat product press apparatus of this invention is sturdy in construction; easy to use; readily steam cleaned; essentially maintainence free; and economical to manufacture.

While the invention has been described in conjunction with preferred specific embodiments thereof, it will be understood that this description is intended to illustrate and not to limit the scope of the invention, which is defined by the following claims.

I claim:

1. A meat product press apparatus operable to receive, hold and compress a food product therein for a cooking and/or smoking food process, comprising
  (a) a lower press assembly providing a support member extending in a generally common plane;
  (b) a top press assembly providing a support assembly extending in a generally common plane;
  (c) a main clamp assembly to releasably interconnect said top press assembly to said lower press assembly to clamp the meat product therebetween;
  (d) said main clamp assembly including an initial bias lock assembly to connect adjacent end portions of said lower press assembly and said top press assembly and a pressure bias lock assembly to connect other adjacent ends of said lower press assembly and said top press assembly;
  (e) said initial bias lock assembly includes bias members and a cam lock member operable in one position to release downward movement of said top press assembly and operable in second position to provide a downward clamping action against the meat product held between said lower and top press assemblies.

2. A meat product press apparatus as described in claim 1, wherein:
  (a) said cam lock member includes a main actuator body havng connector assemblies connected to opposite ends thereof;
  (b) said connector assemblies connected to said bias members; and
  (c) said actuator body engagable with a portion of said top press assembly to hold in the clamped condition.

3. A meat product press apparatus as described in claim 2, wherein:
  (a) said main actuator body contacts an end section of said top press assembly; and
  (b) said bias members resist movement of said top press assembly away from said lower press assembly.

4. A meat product press apparatus as described in claim 1, wherein:
  (a) said bias members being spring members having a main body with integral outer end connector sections to engage and connect adjacent end portions of said lower press assemblies and said cam lock member; and (b) said cam lock member releasably engagable with said top press assembly to bias same toward said lower press assembly.

5. A meat product press apparatus as described in claim 1, wherein:
   (a) said pressure bias lock assembly includes a bias member connected to said lower press assembly and to an upper cam lock member which is engagable with said top press assembly; and
   (b) said pressure bias lock assembly further includes a handle cam lock member which is engagable said upper cam lock member to move same into a cam actuated locked condition.

6. A meat product press apparatus as described in claim 5, wherein:
   (a) said handle cam lock member pivotally connected to an end section of said top press assembly and engagable with said upper cam lock member to move same into and out of engagement with a portion of said top press assembly.

7. A meat product press apparatus as described in claim 1, wherein:
   (a) said cam lock member having a main actuator body integral with end sections;
   (b) said end sections engagable and connected to said bias member; and
   (c) said actuator body releasably engagable with said top press assembly to bias same toward said lower press assembly.

8. A meat product press apparatus as described in claim 7, wherein:
   (a) said cam lock member includes a connector assembly at each outer end of said main actuator body; and
   (b) each of said connector assemblies includes an anchor section to engage a portion of said top press assembly to bias same toward said lower press assembly in the clamped condition.

9. A meat product press apparatus as described in claim 1, wherein;
   (a) said pressure bias lock assembly includes bias members and an upper cam lock member operable in position to release downward movement of said top press assembly and operable in a second position to provide a clamping action between said top press assembly and said lower press assembly.

10. A meat product press apparatus as described in claim 9, wherein;
    (a) said pressure bias lock assembly includes a handle cam lock member pivotally connected to said top press assembly and selectively engagable with said upper cam lock member.

11. A meat product press apparatus as described in claim 10, wherein:
    (a) said handle cam lock member having a central body with integral leg sections; and
    (b) said central body acts as a lever with said leg sections to engage said upper cam lever member to move same into engagement with said top press assembly and held in such engagement by said bias members.

12. A meat product press apparatus operable to receive, hold, and compress a food product therein for a cooking and/or smoking food process, comprising:
    (a) a top press assembly adjacent to but spaced from a lower press assembly;
    (b) a main clamp assembly to releasably connect said top press assembly to said lower press assembly and resiliently clamp the meat product therebetween;
    (c) said main clamp assembly having an initial bias lock assembly to resiliently and pivotally connect one adjacent end of said top press assembly to said lower press assembly;
    (d) said main clamp assembly having a pressure bias lock assembly to resiliently and releasably connect one other adjacent ends of said top press assembly to said lower press assembly; and
    (e) said pressure bias lock assembly having a handle cam lock member pivotal from a released position to a locked position to use cam leverage to resiliently urge said top press assembly toward said lower press assembly.

* * * * *